United States Patent
Killion

(10) Patent No.: US 6,170,453 B1
(45) Date of Patent: Jan. 9, 2001

(54) OIL/AIR SCAVENGING SYSTEM FOR BALANCE SHAFT HOUSINGS

(75) Inventor: David L. Killion, Clakrston, MI (US)

(73) Assignee: Simpson Industries, Inc., Plymouth, MI (US)

( * ) Notice: Under 35 U.S.C. 154(b), the term of this patent shall be extended for 0 days.

(21) Appl. No.: 09/343,396

(22) Filed: Jun. 30, 1999

Related U.S. Application Data

(60) Provisional application No. 60/091,319, filed on Jun. 30, 1998.

(51) Int. Cl.[7] .................................................... F02B 75/06
(52) U.S. Cl. ........................................................ 123/192.2
(58) Field of Search ............................ 123/192.2, 196 R

(56) References Cited

U.S. PATENT DOCUMENTS

| | | | |
|---|---|---|---|
| 4,523,553 | * 6/1985 | Backlund | 123/192.2 |
| 4,703,724 | * 11/1987 | Candea et al. | 123/196 R |
| 4,703,725 | 11/1987 | Weertman. | |
| 4,741,303 | 5/1988 | Kronich. | |
| 4,766,857 | 8/1988 | Lainé. | |
| 5,511,523 | 4/1996 | Masuda. | |

* cited by examiner

Primary Examiner—Willis R. Wolfe
Assistant Examiner—Hyder Ali

(57) ABSTRACT

An oil scavenging system for a vehicle engine, which has at least one upward-facing air inlet opening and at least one upward-facing air/oil discharge opening to draw air into the housing through the inlet as the balance shaft rotates and expels air/oil to the engine through the outlet. The inlet opening and the discharge opening are arranged so as to provide for rapid purging of oil from the housing, minimizing oil aeration, heating and motoring losses.

20 Claims, 2 Drawing Sheets

OIL/AIR SCAVENGING SYSTEM FOR BALANCE SHAFT HOUSINGS

CROSS REFERENCE TO RELATED APPLICATIONS

This application claims priority from co-pending U.S. Provisional Application Ser. No. 60/091,319, which was filed on Jun. 30, 1998.

TECHNICAL FIELD

The present invention relates generally to the discharge of fluid from a housing without the use of a separate pump. More particularly, the present invention relates to a scavenging system for discharging oil from the interior of a housing through the rotation of at least one balance shaft.

BACKGROUND ART

Fluid pumps such as centrifugal pumps and vane pumps are well known in the art for their ability to pump fluid from one location and transfer it to another location. These pumps are utilized in many conventional structures, including automobiles. Their use in automobiles includes use as oil pumps, fuel pumps and power steering pumps. These pumps all typically utilize their own housing and have a separate fluid inlet, a fluid outlet and a mechanism for drawing fluid into the inlet of the pump and discharging fluid through the outlet of the pump for delivery to a source.

Many automobile engines utilize one or more balance shafts to minimize any noise, vibration, and harshness ("NVH") generated by the reciprocation of the engine pistons and other engine operations. These balance shafts rotate or counter-rotate within the engine on bearings fed by lubricating oil. These balance shafts are typically located within housings to prevent sump oil from continually flooding the rotating shafts with resultant oil aeration, oil heating, and net losses of engine power. Oil is pumped from an oil pan both to the bearings of the balance shafts and also to the engine, creating an excess of oil within the balance shaft housing. If this excess oil is allowed to build up within the housing, the same problems of aeration of the oil, oil heating, and engine motoring losses will result from repeated contact between the rotating shafts and the residual unscavenged oil.

It is known in the art that discharge openings must be provided to enable the escape of the oil which is fed to the bearings as well as any oil that may have entered the interior of the housing through openings or unsealed joints of the housing. It is also known that the provision of an inlet air opening is beneficial towards creating air flow out of a discharge opening, which in turn aids the flow of discharge oil. Current inlet and discharge openings suffer from a variety of disadvantages in that they do not minimize oil aeration, oil heating, and motoring losses.

SUMMARY OF THE INVENTION

It is an object of the present invention to provide an oil scavenging system for the housings of engine balance shafts that minimizes engine oil aeration, oil heating, and power consumption by the balance shafts.

It is a further object of the present invention to provide an oil scavenging system that rapidly purges accumulated oil from the housing interior upon engine startup, thereby minimizing fuel consumption.

It is still a further object of the present invention to provide an oil scavenging system that minimizes or eliminates entry of sump oil into the interior of the housing when the surface of the sump oil becomes elevated, whether by accelerations, vehicle inclination, or engine stoppage.

It is yet another object of the present invention to provide an oil scavenging system that reduces the overall cost of the engine.

In accordance with the objects of the present invention, an oil scavenging system for a vehicle engine's balance shaft housing is provided. The oil scavenging system is for use with a vehicle engine having at least one rotating balance shaft in communication therewith for minimizing engine noise, vibration, and harshness. The at least one balance shaft is disposed within a cavity in the shaft housing. The shaft housing has a top surface, a bottom surface, and side surfaces forming an enclosure for the at least one rotating balance shaft. The shaft housing is typically either secured to the bottom of the engine, or is integral to its cylinder block. The shaft housing has at least one inlet opening formed in the top surface of the housing for drawing air into the shaft housing as the at least one balance shaft rotates. The shaft housing has at least one outlet opening formed in the top surface of the housing such that air and oil are forced out of the shaft housing into the engine as the at least one balance shaft rotates.

Other objects and features of the present invention will become apparent when reviewed in light of detailed description of the preferred embodiment when taken in conjunction with the attached drawings and appended claims.

BEST MODE(S) OF THE INVENTION

Figure 1:
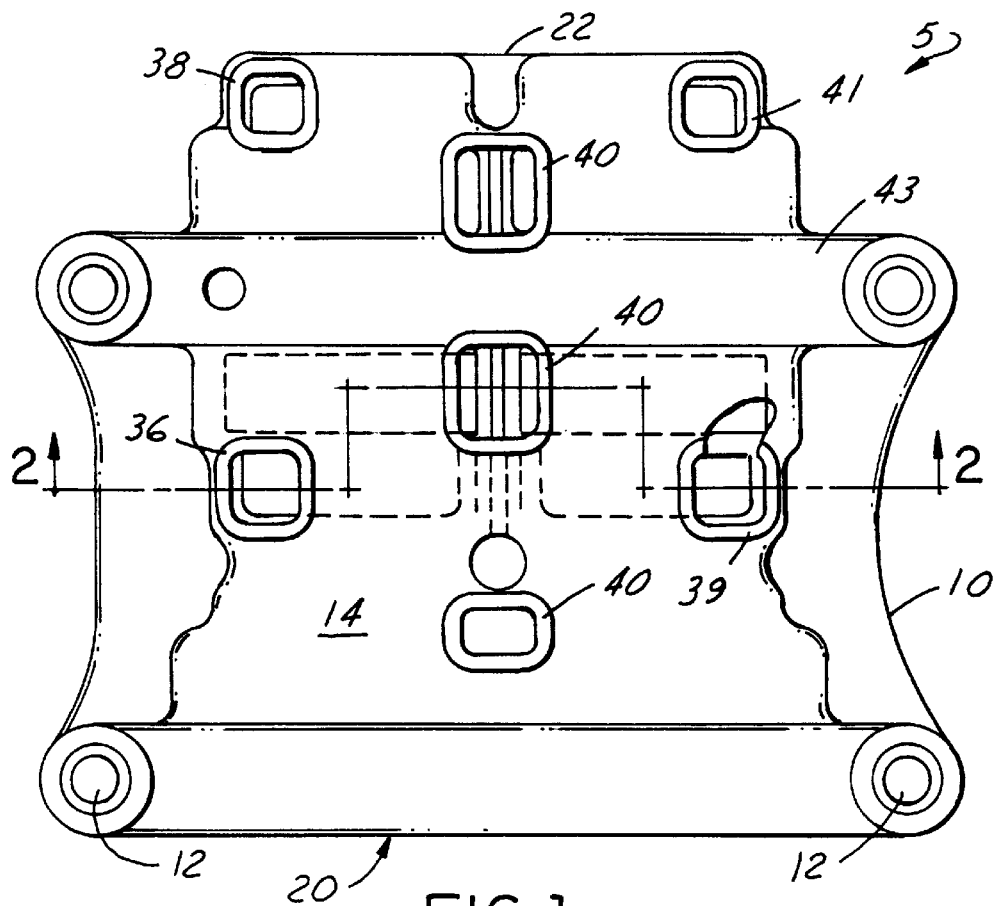
FIG. 1 is schematic top view of a two-shaft housing for a pair of engine balance shafts in accordance with a preferred embodiment of the present invention.
Figure 2:
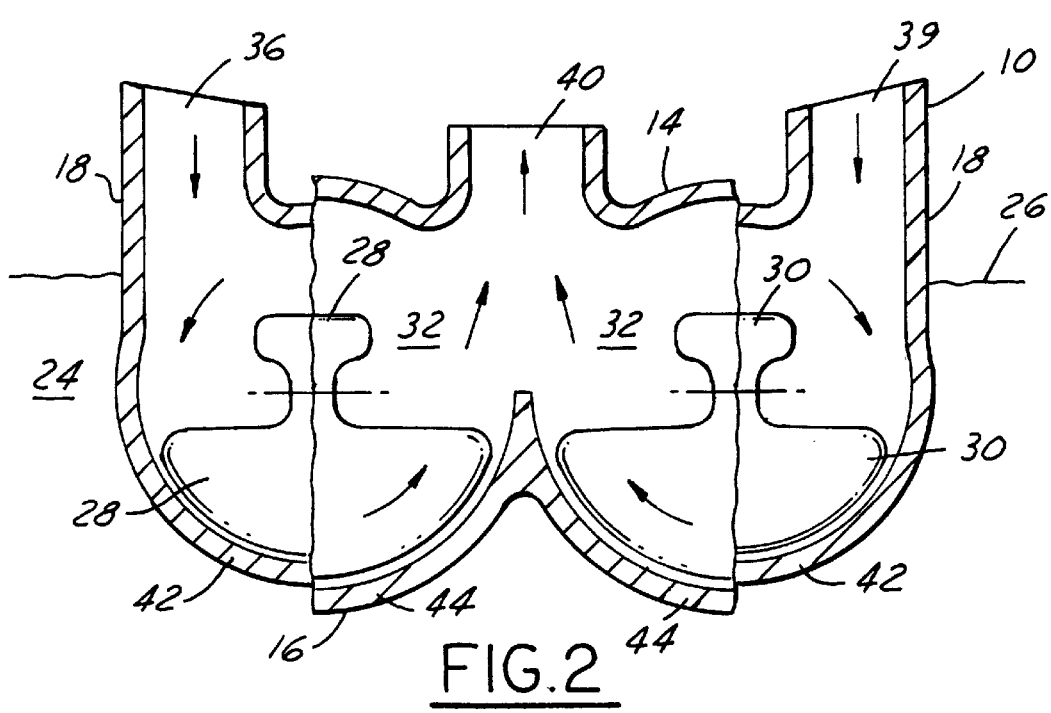
FIG. 2 is a schematic cross-sectional illustration of the two-shaft housing taken along the line 2—2 in FIG. 1 and in the direction of the arrows.
Figure 3:
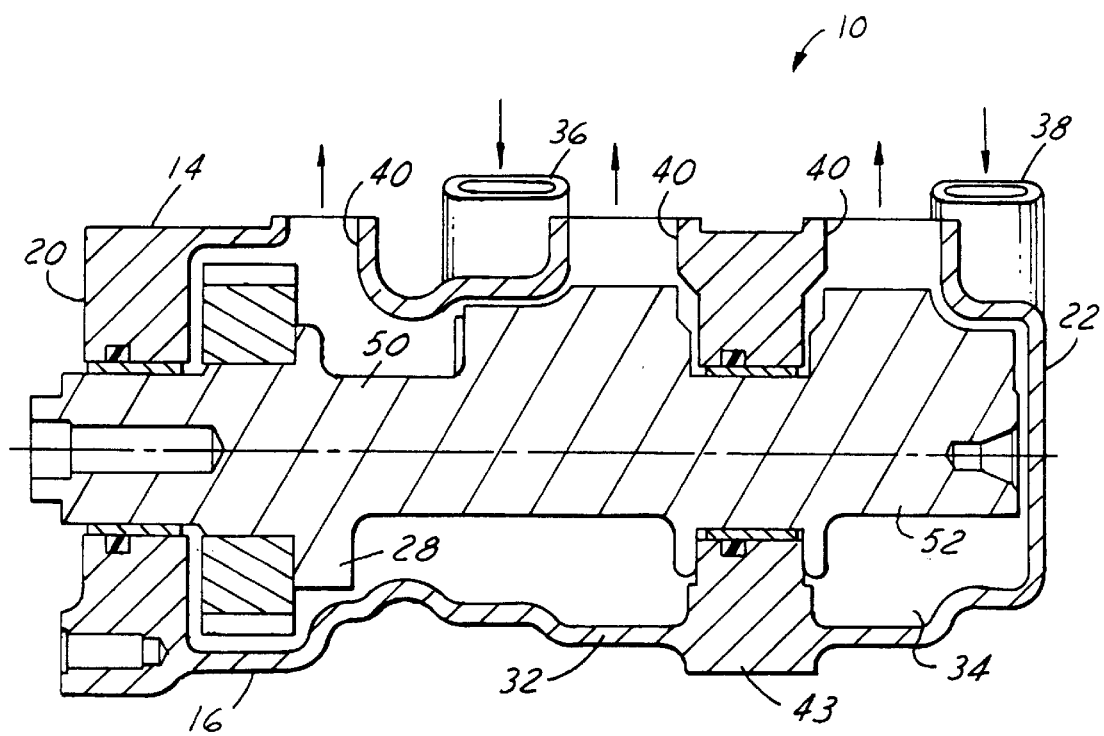
FIG. 3 is a side cross-sectional view of a two-shaft housing in accordance with a preferred embodiment of the present invention.

Referring now to FIGS. 1 through 3, which illustrate a preferred oil scavenging system 5, including a shaft housing 10 in accordance with the present invention. The shaft housing 10 is preferably attached to an engine through a plurality of attachment holes 12 which allow the shaft housing 10 to be mounted to the underside of the engine by any conventional attachment mechanism. The shaft housing may also be integrally formed with the engine cylinder block. The shaft housing 10 preferably includes a top surface 14 adjacent the engine, a bottom surface 16 adjacent the oil pan, a pair of side surfaces 18, a front surface 20, and a rear surface 22. The shaft housing 10 may be formed in a variety of configurations such as cylindrical with a top surface.

The configuration of the interior surfaces of the shaft housing 10 is preferably substantially cylindrical and in substantially constant proximity to the outer surfaces of the balance shafts to facilitate rotation of air masses adjacent the shafts with minimal drag. The shaft housing 10 is partially submerged within an oil pan 24, having a predetermined amount of oil resting in the pan 24, as generally indicated by reference number 26. While the present invention is described specifically with oil, any fluid may be utilized.

In the embodiment shown in FIGS. 1 through 3, the shaft housing 10 is preferably a two-shaft housing that is sized to include a pair of counter-weighted counter-rotating balance shafts 28, 30 disposed therein. The use of balance shafts in connection with an engine to minimize noise, vibration, and harshness is well-known to those of skill in the art. It is well known in the art, how the balance shafts are rotated within the shaft housing.

The shaft housing 10 preferably has a pair of cavities 32, 34 formed therein. A fore cavity 32 and an aft cavity 34 are separated by a bulkhead 35. Each counter-rotating balance shafts 28, 30 is disposed such that each is positioned in both the fore cavity 32 and the aft cavity 34. A plurality of air inlet openings are preferably formed through the top surface 14 of the shaft housing 10. An air inlet opening 36 is in communication with the fore cavity 32 and thus in connection with the fore portion 50 of the first balance shaft 28. An air inlet opening 38 is in communication with the aft cavity 34 and thus in communication with the aft portion 52 of the first balance shaft 28. Similarly, an air inlet opening 39 is in communication with the fore cavity 32 and the fore portion of the first balance shaft 28, while an air inlet opening 41 is in communication with the aft cavity 34 and the aft portion of the second balance shaft 30. The air inlet openings 36, 38, 39, 41, are preferably positioned such that they extend substantially perpendicular or vertical to the top surface 14 of the housing 10 and are also preferably raised with respect to the nominal top surface 26 of the oil in the oil pan.

The shaft housing 10 also has a plurality of discharge openings 40 formed through the top surface 14 of the shaft housing 10. The discharge openings 40 are in communication with both the first and second balance shafts 28, 30 with at least one discharge opening being in communication with the fore cavity 32 and at least one discharge opening being in communication with the aft cavity 34. The discharge openings 40 are also preferably raised with respect to the top surface 14 of the housing 10 and are preferably positioned such that they extend substantially perpendicular to the nominal top surface 26 of the oil in the oil pan 26.

Both the air inlet openings 36, 38, 39, 41 and the discharge openings 40 extend upward to a height at least as high as the top of the lowest adjacent balance shaft enclosing surface. Additionally, the top surfaces of each of the inlet openings 40 are slanted with respect to a plane defined by the level of oil in the pump 26. The top surfaces are slanted such that an upper edge near the perimeter of the housing 10 is higher than an upper edge nearest the middle of the housing 10.

The air inlet openings 36, 39 preferably aligned substantially parallel to the air inlet openings 38, 41. Similarly, the air inlet openings 36, 38, 39, 41 are aligned substantially parallel to the outlet openings 40. The arrangement of the inlet openings 36, 38, 39 41 and the outlet openings 40 allows the system 5 to take advantage of the natural circulation of air as driven by the rotating first and second balance shafts 28, 30. The system allows for this advantage by providing for substantially tangential flow into and out of the domain of the rotation of the shafts 28, 30. By providing rapid purging of oil from the housing 10, repeated contact between balance shafts and accumulated oil is minimized. Further, viscous drag between the balance shafts and the housing interior surfaces is reduced.

Preferably the inlet openings 36, 38 and the discharge ducts 40 are separated axially such that axial flow of air and oil from the inlet area toward the discharge areas are promoted enhancing migration to and discharge of oil from the discharge area. Moreover, where appropriate with balance shafts 28, 30 having stepped or tapered outer boundaries, the air inlet openings 36, 38, 39, 41 are situated in proximity to the smaller radius areas of the shaft outer boundaries such as a balance weight. Similarly, the outlet openings 40 are situated in proximity to the larger radius areas of the shafts 28, 30, such as a balance weight, to create a centrifugal blower effect. The varying radii 42, 44 are shown schematically in FIG. 2. This centrifugal blower effect adds to the pressure differential due to the tangential orientation of the openings with respect to shaft motion, further augmenting scavenging flow for rapid and effective oil purging.

The rotation of the balance shafts 28, 30 causes air to be drawn into the first and second cavities 32, 34 of the shaft housing 10 through the air inlet openings 36, 38, 39, 41. The rotation of the balance shafts 28, 30 simultaneously causes a mixture of air and oil to exit the shaft housing 10 through the outlet openings 40. The outlet openings 40 are preferably in fluid communication with the engine and thus oil that is forced out of the cavities 32, 34 of the shaft housing 10 through the outlet openings 40 through rotation of the balance shafts 24, 26 will enter the engine. It should be understood that the number, location, and configuration of the air inlet openings 36, 38, 39, 41 and the outlet openings 40 may vary. As discussed above, it is preferred that the air inlet openings 36, 38, 39, 41 feed air into communication with the smaller radius areas of the counterweights of balance shafts 28, 30. It is also preferred that the discharge areas or outlet openings 40 are positioned adjacent larger radius areas of the balance shafts 28, 30 to assure that the centrifugal blower effect is not opposing the tangential "vane pump" type flow.

In operation, the first balance shaft 28 and the second balance shaft 30 are counter rotating such that the first balance shaft 28 rotates in a counter-clockwise direction while the second balance shaft 30 rotates in a clockwise direction. It will be understood that the rotation of the two balance shafts 28, 30 may be reversed, so long as they are counter-rotating. In such a configuration, the location of the inlet openings 36, 38 and the outlet openings 40 would also need to be changed to match the radii of the balance shafts.

In accordance with the present invention, oil is rapidly and efficiently purged from the first and second cavities 32, 34 of the shaft housing 10. As the first balance shaft 28 rotates, it draws air into the first cavity 32 through the air inlet openings 36. Similarly, as the second balance shaft 30 rotates it draws air into the second cavity 34 through the air inlet openings 36. The air from the air inlet openings 36 and 38 circulates in the respective shaft housing cavities 32, 34 and acts upon the oil in the shaft housing 10 by the rotation of the first balance shaft 28 and the second balance shaft 30.

The air inlet openings 36, 38, 39, 41 are routed from above the surface of the oil in the pan 24 to locations where the motion of the balance shafts 28, 30 is away from the respective openings 36, 38 tending to draw air into the housing cavities 32, 34 as a result. The air/oil outlet openings 49 are routed from locations where motion of the balance shafts 28, 30 is toward the outlet openings 40 above the surface of the oil in the pan 24 thus tending to throw and blow oil and air out of the housing 10.

Figure 4:
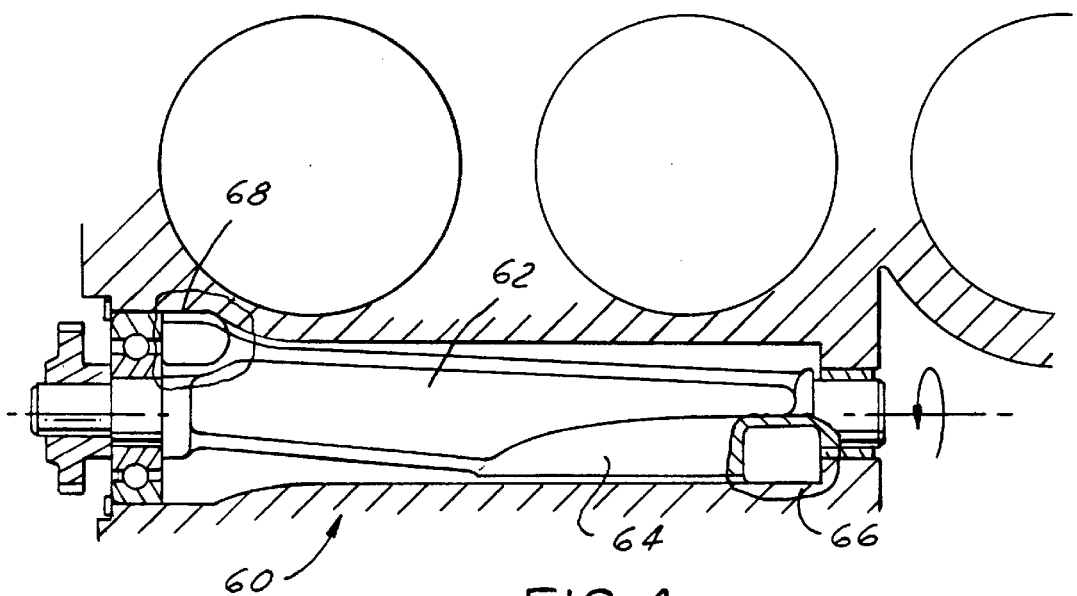
FIG. 4 is a view of a single shaft housing in accordance with a preferred embodiment of the present invention.

FIG. 4 illustrates an alternative embodiment of a shaft housing 60 having a single balance shaft 62 positioned therein. This alternative embodiment operates under the same principles as the prior embodiment except that there is only one balance shaft per each housing. In operation, the single balance shaft 62 rotates within the shaft housing 60 in a clockwise direction as indicated by the arrow A. As the balance shaft 62 rotates it draws air into the interior 64 of the shaft housing 60 through an inlet opening 66 to mix with oil that is in the shaft housing that has entered from the bearings, for example, in the same fashion as described above. As the shaft 62 continues to rotate, it expels an oil/air mixture through the exit opening 68 into communication with the engine. It should be understood that any number of inlet and exit openings may be utilized, furthermore any number of balance shafts may also be utilized. Moreover, the position, configuration and locations of the inlet openings 68 and the outlet openings 66 are preferably the same in this embodiment as with the embodiment described above. However, in this embodiment, the inlet opening 66 need not be parallel with the outlet opening 68.

While particular embodiments of the invention have been shown and described, numerous variations and alternate embodiments will occur to those skilled in the art. Accordingly it is intended that the invention be limited only in terms of the appended claims and not to the preferred embodiments shown as described.

What is claimed is:

1. A balance shaft housing for a vehicle engine having at least one rotating counterweight balance shaft disposed therein, comprising:
    at least one cavity formed in the housing for receipt of the at least one balance shaft;
    at least one air intake opening formed through the housing, said at least one air intake opening facing substantially upward and in communication with said first cavity;
    at least one air/fluid outlet opening formed through the housing, said at least one outlet opening facing substantially upward and in communication with said first cavity;
    whereby said at least one air intake opening is formed through the housing in a region where the direction of circumferential travel of said at least one balance shaft counterweight is substantially away from said at least one air intake opening; and
    whereby said at least one outlet opening is formed through the housing in a region where the direction of circumferential travel of said at least one balance shaft counterweight is substantially toward said at least one outlet opening.

2. The balance shaft housing as recited in claim 1, wherein said at least one air intake opening is displaced axially from said at least one outlet opening.

3. The balance shaft housing as recited in claim 2, wherein said at least one air intake opening is in axial proximity to a portion of said balance shaft counterweight having a smaller radius than the radius of said balance shaft counterweight radius that is in axial proximity to said at least one outlet opening.

4. The balance shaft housing as recited in claim 1, wherein said housing includes a plurality of balance shaft enclosing surfaces.

5. The balance shaft housing as recited in claim 4, wherein at least one of said at least one air intake opening or said at least one outlet opening extends upward to a height at least as high as a top surface of a lowest adjacent balance shaft enclosing surface of said housing.

6. The balance shaft housing as recited in claim 5, wherein an upper edge of at least one of said air intake opening or said at least one outlet opening is slanted with respect to a plane defined by the engine static oil level to reach a height greater near a perimeter of said housing than that of an upper edge nearest a middle portion of said housing.

7. The balance shaft housing as recited in claim 1, wherein the housing is partially submerged in an engine oil pan.

8. The balance shaft housing as recited in claim 5, wherein an upper perimeter of at least one of said air intake opening or said at least one outlet opening is slanted such that it is always above the upper surface of engine oil in the pump under normal conditions.

9. The balance shaft housing as recited in claim 1, further comprising a plurality of cavities formed in the housing with each cavity receiving a portion of said at least one balance shaft.

10. An oil scavenging system for a vehicle engine, having at least one counterweight balance shaft comprising:
    a balance shaft housing having a plurality of enclosing surfaces for defining at least one cavity for receiving said at least one balance shaft therein, said shaft housing located adjacent the vehicle engine and not subjected to emersion in sump oil;
    at least one air inlet opening formed through said housing and in communication with said at least one cavity, said at least one air inlet opening being formed in said housing in a region where the direction of circumferential travel of one counterweight of said at least one counterweight balance shaft is substantially away from said at least one air inlet opening; and
    at least one fluid outlet opening formed through said housing and in communication with said at least one cavity, said at least one outlet opening being formed in said housing in a region where the direction of circumferential travel of one of said at least one counterweight or an adjacent counterweight of said at least one counterweight balance shaft is substantially toward said at least one outlet opening.

11. The oil scavenging system as recited in claim 10, wherein said at least one air inlet opening is facing substantially upward.

12. The oil scavenging system as recited in claim 11, wherein said at least one outlet opening is facing substantially upward.

13. The oil scavenging system as recited in claim 12, wherein said at least one air inlet opening is displaced axially from said at least one outlet opening.

14. The oil scavenging system as recited in claim 13, wherein said at least one air inlet opening is in axial proximity to a portion of said at least one balance shaft counterweight having a smaller radius than a radius of another portion of said at least one balance shaft counterweight which is in axial proximity to said at least one outlet opening.

15. The oil scavenging system as recited in claim 10, wherein said balance shaft housing is integrally formed with the vehicle engine.

16. The oil scavenging system as recited in claim 10, wherein said balance shaft housing is attached to the vehicle engine.

17. A method for scavenging oil from a balance shaft housing, including at least one counterweight balance shaft comprising:
    enclosing said at least one balance shaft in the balance shaft housing;
    locating the balance shaft housing adjacent a vehicle engine to effectuate fluid communication therebetween;
    locating at least one upward-facing air inlet opening in the housing in a region where the direction of circumferential travel of one of said balance shaft counterweights is substantially away from said at least one inlet opening;

locating at least one upward-facing outlet in the housing in a region where the direction of circumferential travel of said one of said balance shaft counterweights or another of said balance shaft counterweights is substantially toward said at least one outlet opening;

displacing said air inlet opening axially from said outlet opening with respect to the rotation of said at least one outlet opening;

drawing air into the housing through said at least one air intake opening through rotation of said balance shaft; and discharging oil from the housing through said at least one outlet opening.

18. The method as recited in claim 17, wherein at least one of said at least one air intake opening or said at least one outlet opening extends upward to a height at least as high as a top surface of a lowest adjacent surface of the balance shaft housing.

19. The method as recited in claim 17, wherein said at least one air intake opening is displaced axially from said at least on outlet opening.

20. The method as recited in claim 19, wherein said at least one air inlet opening is in axial proximity to a portion of said at least one balance shaft counterweight having a smaller radius than a radius of another portion of said at least one balance shaft counterweight which is in axial proximity to said at least one outlet opening.

* * * * *